US010852003B2

(12) United States Patent
Stroh et al.

(10) Patent No.: US 10,852,003 B2
(45) Date of Patent: Dec. 1, 2020

(54) METHOD AND DEVICE FOR THE TARGETED CONVEYING OF INFORMATION TO CUSTOMERS USING COOKING APPLIANCES AND/OR TO COOKING APPLIANCES OF A COOKING APPLIANCE MANUFACTURER

(71) Applicant: Convotherm-Elektrogeräte GmbH, Eglfing (DE)

(72) Inventors: Konstantin Stroh, Murnau am Staffelsee (DE); Stan Smits, Weilheim (DE); Gisela Rosenkranz, Munich (DE); Hannes Wild, Riegsee (DE); Marina Fischer, Peiting (DE); Cornelia Chowanetz, Wielenbach (DE)

(73) Assignee: CONVOTHERM-ELEKTROGERATE GMBH, Eglfing (DE)

( * ) Notice: Subject to any disclaimer, the term of this patent is extended or adjusted under 35 U.S.C. 154(b) by 0 days.

(21) Appl. No.: 16/490,734

(22) PCT Filed: Feb. 26, 2018

(86) PCT No.: PCT/EP2018/054651
§ 371 (c)(1),
(2) Date: Sep. 3, 2019

(87) PCT Pub. No.: WO2018/158186
PCT Pub. Date: Sep. 7, 2018

(65) Prior Publication Data
US 2020/0018486 A1 Jan. 16, 2020

(30) Foreign Application Priority Data

Mar. 3, 2017 (DE) .......................... 10 2017 203 511

(51) Int. Cl.
| G06F 15/16 | (2006.01) |
| F24C 7/08 | (2006.01) |
| G06Q 30/02 | (2012.01) |
| G09F 23/00 | (2006.01) |
| H05B 6/68 | (2006.01) |

(52) U.S. Cl.
CPC ........... F24C 7/08 (2013.01); G06Q 30/0201 (2013.01); G09F 23/0058 (2013.01); H05B 6/687 (2013.01); *G05B 2219/2643* (2013.01)

(58) Field of Classification Search
CPC ... F24C 7/08; G06Q 30/0201; G09F 23/0058; H05B 6/687; G05B 2219/2643
(Continued)

(56) References Cited

U.S. PATENT DOCUMENTS

| 6,557,756 B1 | 5/2003 | Smith |
| 7,092,988 B1 | 8/2006 | Bogatin et al. |

(Continued)

FOREIGN PATENT DOCUMENTS

| DE | 69933914 | 5/2007 |
| DE | 202010014337 U1 | 2/2013 |
| DE | 102013204634 A1 | 9/2014 |
| WO | 2014118295 A1 | 8/2014 |

OTHER PUBLICATIONS

International Preliminary Report on Patentability (IPRP) dated Sep. 3, 2019 for PCT application No. PCT/EP2018/054651.

*Primary Examiner* — Atta Khan
(74) *Attorney, Agent, or Firm* — Ohlandt, Greeley, Ruggiero and Perle, LLP

(57) ABSTRACT

A method for the targeted conveying of information to individuals using cooking appliances and/or to at least one cooking appliance of a cooking appliance manufacturer, the method having the following method steps: determining by the cooking appliance manufacturer the usage behavior of the customer(s) and/or the operating behaviour of the cooking appliance(s) and/or transferring to the cooking appliance (Continued)

manufacturer the usage behaviour of the individual(s) and/or the operating behaviour of the cooking appliance(s); saving at the cooking appliance manufacturer the determined usage behaviours of the customer or the operating behaviour of the cooking appliance(s) (GG2, GG3); receiving information sent by cooperation partners of the cooking appliance manufacturer and/or receiving information established internally at the business; evaluating by the cooking appliance manufacturer the receiving information taking into consideration the saved usage or operating behavior to determine which of the items of received information and/or information established internally at the business could be of interest for which individuals or for which cooking appliance; and conveying the determined information of potential interest to the corresponding individual(s) and/or to the corresponding cooking appliance.

12 Claims, 2 Drawing Sheets

(58) Field of Classification Search
USPC ............................................. 709/217
See application file for complete search history.

(56) References Cited

U.S. PATENT DOCUMENTS

2002/0120502 A1* 8/2002 Sakaguchi .............. H04L 29/06
705/14.49
2014/0310189 A1* 10/2014 Cartwright ............ H04L 65/403
705/319

* cited by examiner

METHOD AND DEVICE FOR THE TARGETED CONVEYING OF INFORMATION TO CUSTOMERS USING COOKING APPLIANCES AND/OR TO COOKING APPLIANCES OF A COOKING APPLIANCE MANUFACTURER

BACKGROUND

1. Field of the Disclosure

The disclosure relates to a method for the targeted communication of information.

2. Discussion of the Background Art

Known from U.S. Pat. No. 7,092,988 B1 is a system in which a user in a household utilizes an oven and communicates via a bidirectional communication link with a service provider, which, in turn, communicates with cooperating partners and specialized service providers. The service partner collects content that it receives from partners and from a collective database. This information can be further transmitted to the user or else directly to the oven and the processing units thereof.

It is known from DE 102013204634 A1, for example, how to link the control of a cooking appliance to a recipe database via an interface, wherein the interface can be designed as an Internet access.

WO 2014/118295 A1 describes a cooking appliance that has a viewing window in a cooking chamber door, wherein at least a part of the viewing window has a transparent display that is capable of displaying information. For this purpose, the cooking appliance can be equipped with network interfaces and connections to external storage media, so that information can be transferred to the cooking appliance.

DE 202010014337 U1 describes a cooking arrangement that is provided with a system for the interconnection and operation of various components, so as to simplify their support in the preparation of foods, whereby said system monitors the cooking process by comparing diverse parameters and detects, indicates, and/or acts on anomalies in order to avert damage or other hazardous situations, whereby the system can be linked to the Internet. Finally, DE 69933914 T2 discloses a household appliance that, as a primary household function, can have the "cooking" function, and, as a secondary function, enables the interaction with a communications portal. In order to induce the user of this household appliance to remain with said communications portal through the provision of a portal service that is relevant to the preferences of the user, one example that is described in DE 69933914 T2 relates to an Internet portal that provides content or advertisement segments under the control of a content transmission machine and/or an advertising machine, wherein the portal is linked to a user profile database, which affords authorized users access to this memory and provides output for the content transmission machine and/or the advertising machine in order to fine-tune the content and/or the advertisement in accordance with the known preferences in a targeted manner.

Investigations that were conducted in the scope of the disclosure have revealed that, in particular for the system that is known from U.S. Pat. No. 7,092,988 B1 as well as also for the example just mentioned, a problem encountered in these and also other known kinds of information communication is that this communication of information has been previously conducted exclusively with the support of machines, such as, for example, by way of the previously mentioned advertising machine and/or a user profile database that supplies the output of the content transmission machine and/or the advertising machine. Since this purely machine-supported communication of information dispenses with a continually adjustable professional evaluation of the information and/or advertising content that is available in principle so as to avoid flooding the user of such a cooking appliance with a large amount of information and/or advertising content, because, in spite of the utilization of known preferences of a user, further constraints, such as, for example, energy costs, technical problems related to appliances, handling difficulties, the use of different cooking methods, or else the circumstance that a plurality of different users can utilize a cooking appliance and only the existence of one user who is the primary user of the cooking appliance can be taken into consideration, it is not possible to take into consideration the user in a targeted manner during the communication of information.

The object of the disclosure is to create a method and a device for the communication of information to customers using cooking appliances and/or to the cooking appliances themselves, the method and device making it possible to conduct the communication of information in a targeted manner, which takes into consideration a plurality of influencing parameters.

Before the principles of the method according to the disclosure are addressed individually, it is noted that, in the scope of this application, the term "cooking appliance" is understood to mean both commercial cooking appliances and also household appliances and, overall, quite generally comprises food processing appliances, which can carry out both cold and hot treatments of foods and can comprise, for example, hot-air steamers, combi steamers, automatic beverage dispensers, beverage mixers, microwave appliances, ice machines, and other food processing appliances.

SUMMARY

The method according to the disclosure is characterized, first of all, by the method step that the utilization behavior of the customer or customers is determined by the cooking appliance manufacturer itself. This affords the advantage that, based on the detailed knowledge of its cooking appliance that is being utilized by the user, the cooking appliance manufacturer is able to determine and evaluate the utilization behavior more effectively and in an appliance-specific manner, because only the cooking appliance manufacturer knows precisely the influence that one or another utilization behavior has on the utilization of its cooking appliance by the user. This process step alone thus makes it possible to categorize precisely the utilization behavior, that is, to evaluate certain behaviors as being more important than other behaviors or of ignoring certain behaviors in the case that said behaviors are of extremely subordinate importance.

The same advantage ensues in the next step of the method, which relates to the receipt of information that is sent to the cooking appliance manufacturer from its cooperating partners, such as, for example, producers of seasonings, suppliers of accessories, or suppliers of raw ingredients, and/or is received through information that is determined in a company-internal manner, because, in this method step as well, the cooking appliance manufacturer itself is again able to evaluate the received information in a professional and targeted manner. Furthermore, it is also conceivable to utilize public services as cooperating partners, which, for example, can supply information relating to new legal standards (for example, in the food sector) or relating to hygiene requirements.

The next step relates to the evaluation of the received information by the cooking appliance manufacturer, taking into consideration the stored utilization behavior, in order to determine which pieces of received information and/or information determined in a company-internal manner might be of interest to which customers, and, in regard to the previously mentioned advantages, is significant inasmuch that, by way of this evaluation, which again is conducted by the cooking appliance manufacturer (and not by external machines), the quality of the evaluation result is optimized, because the evaluation by the cooking appliance manufacturer itself is necessarily substantially more professional and targeted than when such an evaluation is carried out by preprogrammed external machines. The last method step of the communication of specific information of potential interest to the respective customer or customers or to the respective cooking appliance affords, above all, the advantage that a flood of information that is of subordinate interest or is even of no interest at all can be avoided and this motivates the user to become aware of at least the information that has been transmitted in a targeted manner, because the user knows that this information was evaluated beforehand by the cooking appliance manufacturer and the user can thus assume that he receives only information that is of potential interest to him.

Thus, in an especially preferred embodiment, it is possible to display information of potential interest at the cooking appliance itself and/or at a central or decentralized administrative site (for example, headquarters) and/or at mobile information devices, such as, for example, mobile phones of the user.

Furthermore, the previously mentioned method approach affords the possibility of adapting the communication of information to an current operating behavior of the user or of the cooking appliance in a near real-time manner, because, as mentioned previously, the evaluation of information of potential interest is conducted by the cooking appliance manufacturer itself, so that the cooking appliance manufacturer can determine in an appreciably more real-time manner than an external machine, for example, whether a current operating behavior, such as, for example, a short-term change in this operating behavior caused by increased utilization necessitates or at least makes advisable a near real-time communication of information.

Furthermore, in another especially preferred embodiment of the method according to the disclosure, it is possible for the evaluation to take into consideration information in the form of operating parameter information, which, for example, may concern an increase in a core temperature, so as to avoid health risks. Such an increase in the core temperature may be necessary, for example, in the case of poultry preparations due to health aspects in order to kill germs and viruses by way of the increase in temperature, such as, for example, to kill avian influenza virus with certainty, even though the cooked food would already be cooked perfectly at a lower temperature.

Furthermore, in another especially preferred embodiment, the method according to the disclosure makes it possible for operators to take into consideration personalized information in the evaluation, in particular in regard to preferred cooked foods and cooking parameters and this again is based on the fact that the evaluation is carried out by the cooking appliance manufacturer itself.

Furthermore, it is possible that, during the evaluation, information of an inventory control system is taken into consideration, and that, in another especially preferred embodiment, the communicated information is displayed by way of a video output, via an audio output, and/or via pictograms.

Finally, in another especially preferred embodiment, the method according to the disclosure also makes it possible, during the evaluation, to take into consideration compulsory or optional service training and/or operator training, which, for example, is or are especially important in the event of changes in the laws that may influence the operation of a cooking appliance. This may relate, in particular, to cleaning regulations, for which, for example, prohibitions of cleaning agents can ensue, whereby said cleaning agents were permitted at a certain point in time, but, on account of the changes in the laws, are no longer permitted to be used at a later point in time. In this connection, it is also possible to take into consideration hygiene regulations (for example, HACCP).

BRIEF DESCRIPTION OF THE DRAWINGS

Further details, advantages, and features of the present disclosure ensue from the following description of the method according to the disclosure on the basis of the drawing. Shown therein is.

DETAILED DESCRIPTION OF THE PREFERRED EMBODIMENT

Figure 1:
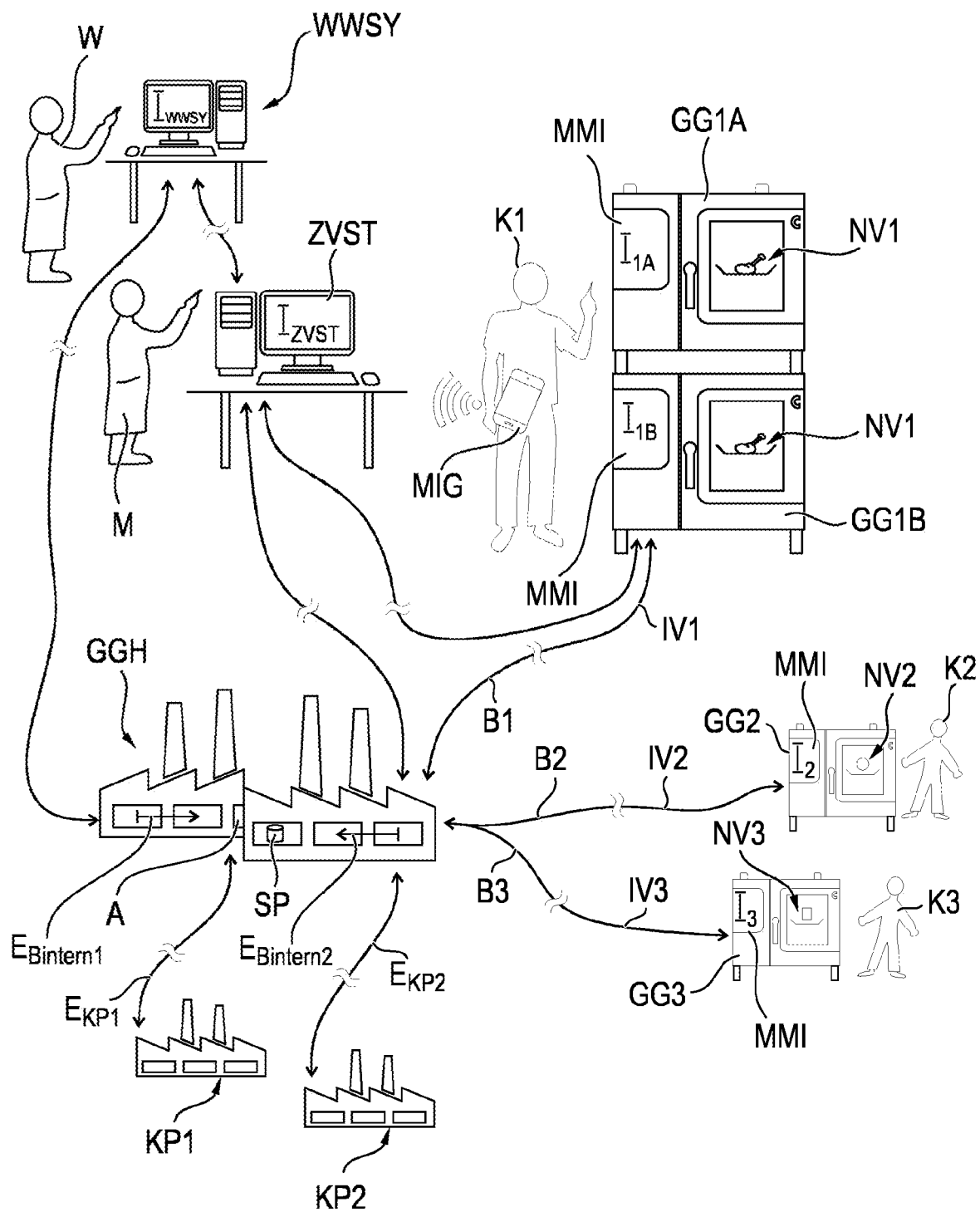
FIG. 1 a schematically highly simplified illustration for the explanation of the principles of the method according to the disclosure, and FIG. 2 a schematically highly simplified illustration of an embodiment of a device according to the disclosure.

FIG. 1 shows in a schematically highly simplified manner a cooking appliance manufacturer GGH or the technical facilities thereof, which, in the exemplary case, can conduct a targeted communication of information I1A and I1B to two cooking appliances GG1A and GG1B of a customer K1 and/or directly to cooking appliances, which, in the drawing, are identified by the reference characters GG2 and GG3, respectively. If a customer K1 is to be supplied with information, it is possible to provide corresponding display devices on the cooking appliances GG1A and GG1B used by the customer K1, such as a control and display unit MMI, which is illustrated by way of example, or to inform the customer K1 via mobile information devices MIG, such as, for example, a mobile telephone of the customer K1.

The utilization behavior of the customer K1 is symbolized in the drawing by the reference characters NV1, while the operating behavior of the cooking appliances GG2 and GG3 is symbolized by the reference characters NV2 and NV3.

The step of determining and transmitting the utilization behavior NV1 of the customer K1 or the operating behavior NV2, NV3 of the cooking appliances GG2 and GG3 is symbolized by the double arrows B1 to B3, according to which the specific utilization behavior NV1 or operating behaviors NV2, NV3 are stored at the cooking appliance manufacturer GGH, for which purpose a memory storage arrangement SP can be provided at the cooking appliance manufacturer GGH.

Furthermore, it is possible to receive information from cooperating partners KP1 and KP2, this being symbolized by the arrows $E_{KP1}$, $E_{KP2}$. This information of the cooperating partners KP1 and KP2 can be delivered to the cooking appliance manufacturer GGH. Furthermore, the cooking appliance manufacturer GGH can receive information $E_{Bintern1,2}$ that is determined in a company-internal manner, such as, for example, information of employees that can be based on development work or customer contacts. By way of example, a piece of information EKP1 of a cooperating partner KP1 that markets seasonings could be the commercial launch of a new seasoning mix that has been specially developed for chicken.

The evaluation A of the received information takes place by the cooking appliance manufacturer GGH, taking into consideration the stored utilization behavior NV1 of the customer K or the operating behavior NV2, NV3 of the cooking appliances GG2 and GG3, so that it can be determined which of the received pieces of information and/or which pieces of information that has been determined in a company-internal manner might be of potential interest to which customer K or to which cooking appliance GG2 or GG3. Thus, the cooking appliance manufacturer GGH, taking into consideration the stored utilization behavior NV1 of the customer K1, who is increasingly using chicken recipes, would display the information relating to the commercial launch of the new seasoning mixture in a targeted manner on the customer's cooking appliance.

This targeted evaluated information is delivered to the respective customer K1 or to the respective cooking appliance GG2 or GG3 in accordance with the arrows IV1, IV2, and IV3, respectively, whereby, in the case of the communication of information to a customer K1, this information can be displayed, for example, on a display of the respective cooking appliance GG1A or GG1B or, as stated, can be output on a mobile information device MIG.

If the information is transferred to the cooking appliances GG2 and GG3 themselves, it is possible for the respective cooking appliances to process this information in their cooking appliance control unit GS (see FIG. 2) and, if needed or optionally, to implement it.

FIG. 1 further highlights that the cooking appliance manufacturer GGH can communicate by way of signal with a central administrative site ZVST, to which the information that is also of interest can be transmitted. Oftentimes, the local or decentralized central administrative site ZVST is managed by a (culinary) manager M, who himself or herself utilizes the cooking appliance GG only contingently. Therefore, the provision of the targeted information in the ZVST is especially advantageous, because the (culinary) manager is oftentimes also the responsible person and decision-maker in regard to the handling of the transmitted information.

Furthermore, in the especially preferred embodiment illustrated in the drawing, it is provided that the cooking appliance manufacturer GGH can communicate by way of signal with a local or decentralized inventory control system WWSY in order to be able to take into consideration during the evaluation any information passed on by a WWSY manager W, who manages the inventory control system WWSY.

In addition to the method according to the disclosure, the disclosure further relates to a device 1 according to the disclosure for targeted communication of information to customers K1, K2, and/or K3 of cooking appliances GG or to the cooking appliances GG themselves, which are explained below on the basis of FIG. 2. Illustrated in FIG. 2 in a schematically simplified manner is a cooking appliance GG. This cooking appliance GG has, in addition to the control and display unit MMI, which is also referred to as a user interface with an input device and a display device, the also already mentioned cooking appliance control unit GS, which is illustrated in a schematically simplified manner by a block.

The cooking appliance GG further has a determination unit BE, with which the utilization behavior of persons operating the cooking appliance GG and/or the operating behavior of the cooking appliance GG itself is or are determined.

This information is transmitted to the cooking appliance manufacturer GGH or to the device 1 for the targeted communication of information, for which purpose the cooking appliance GG can be connected, for example, to a network connection NWA via a data cable DK. For this purpose, the cooking appliance GG can have a transmission unit UE, which can be connected via the data cable DK to the network connection NWA.

However, it is alternatively possible for the data transmission to be realized via a radio frequency connection, for which purpose the transmission unit UE communicates by way of signal with or is operatively connected to an internal or external antenna for radio frequency transmission.

Figure 2:
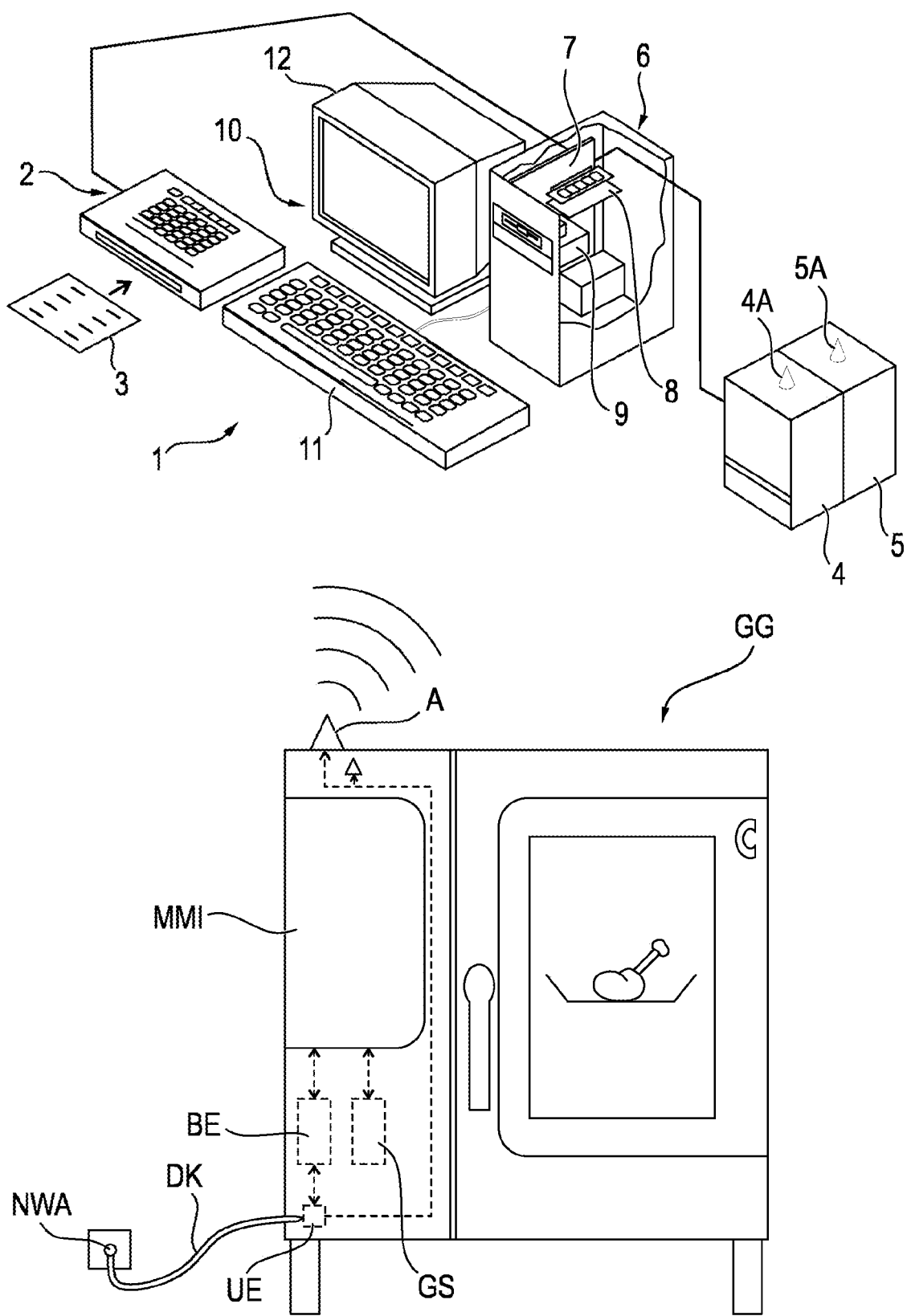

As illustrated in FIG. 2, the device 1 according to the disclosure can have a computer 6, in which a memory storage device 7 is arranged for storing the specific utilization behavior of the customer or the operating behavior of the cooking appliance or cooking appliances GG at the cooking appliance manufacturer GGH. The computer 6 further has an analysis unit, which is symbolized in FIG. 2 in a schematically simplified manner by two analysis blocks 8, 9, which communicate with the memory storage device 7 by way of signal or else are operatively connected to it.

The utilization behavior or operating behavior determined at the cooking appliance GG can be transmitted to a receiving device 4 of the device 1, for which purpose the previously explained network link or else transmission by radio frequency can be used. In the schematically simplified illustration of FIG. 2, the receiving device 4 is coupled to a transmission device 5, which also can transmit information either via a network link or via a radio frequency link to the cooking appliance GG, for which purpose these two devices can either also be provided with a network connection or else be furnished with the antennas 4A and 5A, which are respectively illustrated in a schematically simplified manner.

In the embodiment illustrated in FIG. 2, the device 1 further has a receiving device 2, which, for example, can be a scanner, with which information from cooperating partners can be received and is symbolized in FIG. 2 by the sheet 3, which can be recorded by the scanner 2 and this recorded information can be further transmitted to the memory storage device 7 of the computer 6. However, information of this kind can also be received via the receiving device 4 by means of network transmission or radio frequency transmission.

Furthermore, the device 1, as illustrated in FIG. 2 by way of example, can comprise a PC work station 10, which can be furnished with a keyboard 11 and a display screen 12. This PC work station 10 can be used to carry out further operating steps for the computer 6 and to display them via the display screen 12, for example, when the analysis unit 8, 9 has evaluated the data received from the cooking appliance GG and the information received from cooperating partners. In this case, it is possible for an operator to utilize the PC work station 10 to control the communication of information to the respective customer or customers or to the respective cooking appliance or cooking appliances GG.

In addition to the preceding written disclosure of the disclosure, reference is herewith made explicitly to the drawing illustration in FIGS. 1 and 2 for supplemental disclosure of the disclosure.

What is claimed is:

1. A method for the targeted communication of information to a person using at least one cooking appliances or to at least one cooking appliance comprising the following steps:
   determining (a) the utilization behavior of the person using the at least one cooking appliance or (b) the operating behavior of the at least one cooking appliance by the cooking appliance manufacturer;
   storing the specific utilization behavior of (a) the person using the at least one coking appliance or (b) the operating behavior of the at least one cooking appliance or cooking appliances at the cooking appliance manufacturer;
   receiving of information by the cooking appliance manufacturer (a) sent by cooperating partners of the cooking appliance manufacturer or (b) determined in an internal manner at the cooking appliance manufacturer;
   evaluating the received information by the cooking appliance manufacturer, taking into consideration the stored utilization behavior or operating behavior, to determine which information received or determined might be of interest to the person using the at least one cooking appliance or to the cooking appliance; and
   communicating evaluated information that might be of interest to the person using the at least one cooking appliance or to the respective cooking appliance by the cooking appliance manufacturer.

2. The method according to claim 1, further comprising:
   displaying the information that might be of interest at a location selected from the group consisting of: the at least one cooking appliance, central administrative site, a mobile information device, an inventory control system or any combinations thereof.

3. The method according to claim 1, wherein the communicating of information is adapted to a current operating behavior (a) of the person using the at least one cooking appliance or (b) of the cooking appliance.

4. The method according to claim 1, wherein operating parameters selected from the group consisting of: an increase in a core temperature, adjustment of a cooking parameter, a cleaning parameter to avoid health risks and any combinations thereof, are taken into consideration during the evaluating step.

5. The method according to claim 1, wherein personalized information comprising preferred cooked foods or cooking parameters by the person using the at least one cooking appliance operators, is taken into consideration during the evaluation step.

6. The method according to claim 1, wherein, information of an inventory control system is taken into consideration, during the evaluation step.

7. The method according to claim 1, wherein the communicated information is displayed in a manner selected from the group consisting of: a video output, an audio output, pictograms or any combinations thereof.

8. The method according to claim 1, wherein operator training or service training is taken into consideration during the evaluation step.

9. A device for the targeted communication of information to a person using at least one cooking appliances or to at least one cooking appliance for conducting the method according to claim 1, the device comprising:

a memory storage device for storing at the cooking appliance manufacturer a utilization behavior of (a) the person using the at least one cooking device or (b) the operating behavior of the at least one cooking appliance;
   a receiving device for receiving information, determined by the cooking appliance, at the cooking appliance manufacturer of (a) the utilization behavior of the person using the at least one cooking device or (b) the operating behavior of the cooking appliance, wherein the receiving device communicates with the cooking appliance by way of signal;
   a receiving device for receiving information at the cooking appliance manufacturer (a) sent by cooperating partners of the cooking appliance manufacturer or (b) determined in an internal manner at the cooking appliance manufacturer, wherein the receiving device communicates with the memory storage device by way of signal;
   an analysis unit for the evaluation of the information at the cooking appliance manufacturer received from the cooperating partners or determined in the internal manner, wherein the analysis unit communicates with the memory storage device by way of signal; and
   a transmission device at the cooking appliance device manufacturer that communicates with the analysis unit by way of signal and transmits evaluated information that might be of interest (a) to the person using the at least one cooking device person or (b) to at least one cooking appliance.

10. The method according to claim 1, wherein the determining is performed by transmitting the utilization behavior of the person using the at least one cooking appliance or of the operating behavior of the at least one cooking appliance to the cooking appliance manufacturer.

11. The method according to claim 8, wherein the operator training or service training is compulsory or optional.

12. A method for the targeted communication of information to a person using at least one cooking appliance or to at least one cooking appliance comprising the following steps:
   determining (a) the utilization behavior of the person using the at least one cooking appliance or (b) the operating behavior of the at least one cooking appliance by the cooking appliance manufacturer;
   storing the specific utilization behavior of (a) the person using the at least one coking appliance or (b) the operating behavior of the at least one cooking appliance at the cooking appliance manufacturer;
   receiving information by the cooking appliance manufacturer (a) sent by cooperating partners of the cooking appliance manufacturer or (b) of information determined in an internal manner at the cooking appliance manufacturer;
   evaluating the received information by the cooking appliance manufacturer, taking into consideration the stored utilization behavior or operating behavior to determine which information received or determined might be of interest to the person is using the at least one cooking appliance or to the cooking appliance; and
   communicating evaluated information that might be of interest to the person using the at least one cooking appliance or to the respective cooking appliance by the cooking appliance manufacturer, wherein the determining, storing, receiving, evaluating and communicating are performed only by the cooking appliance manufacturer.

\* \* \* \* \*